July 26, 1966  W. A. BEDFORD, JR  3,262,352

APERTURE SEALING FASTENERS

Filed June 29, 1964

INVENTOR.
WILLIAM A. BEDFORD, JR.

BY

ATTORNEYS

United States Patent Office 3,262,352
Patented July 26, 1966

3,262,352
APERTURE SEALING FASTENERS
William A. Bedford, Jr., Littleton, Colo., assignor, by mesne assignments, to Republic Industrial Corporation, New York, N.Y., a corporation of Delaware
Filed June 29, 1964, Ser. No. 378,929
5 Claims. (Cl. 85—70)

This application is a continuation-in-part of my application Serial No. 142,709, filed October 3, 1961, and now abandoned.

This invention relates to fastening devices and has particular reference to a device for securing an article or articles to an apertured mounting wall, panel, or the like (hereinafter merely called "panel"). Devices embodying the principles of the present invention may be used with or form a part of molding clips, cable clamps, or rivet-like fasteners, among numerous other items, which employ bolts or studs (hereinafter merely called "bolts") for insertion through apertures in a mounting panel.

It is an object of the present invention to provide a novel fastening device which may be easily applied to an apertured mounting panel from one side thereof and which is formed to clampingly engage the panel so as to seal the aperture therein against the passage of dust, moisture, and the like and prevent the fastening device from shifting or loosening within the aperture in the panel.

Another object is to provide a combined securing and insulating device which employs a bolt and nut for positive fastening, but which effectively insulates the bolt and nut from the mounting panel.

Still another object is to provide a fastener which may be manipulated to insure the positive and tight attachment of an article to a panel in as flush a manner as is possible even though there is available only limited access to the fastener, the panel, or the article to be attached to the panel.

Yet, another object is to provide a fastener which is simple in nature, economical to produce, and adaptable to economical mass production.

The invention enables the accomplishment of the above recited and other objects that will hereinafter appear through the provision of a fastener comprising a substantially cylindrical body formed of plastic material and adapted to receive a threaded bolt and be deformed between a head on one end of the bolt and a nut threaded onto the opposite end thereof. The cylindrical body is formed with a thick wall portion at one end and a thin wall portion at the other end thereof, the thin wall portion being specially shaped to collapse and be flattened in a controlled manner to form a securing flange, spacer, or washer that aids in closing and sealing a receiving aperture in a mounting panel.

The objects and advantages of the present invention and how they are achieved will be more fully understood from the following description of a number of embodiments of the invention and from the accompanying drawing illustrating the same, it being understood that such embodiments are presented as examples of presently preferred forms of the invention without intending that the invention be considered limited thereto.

Referring to the drawing.

Figure 1:
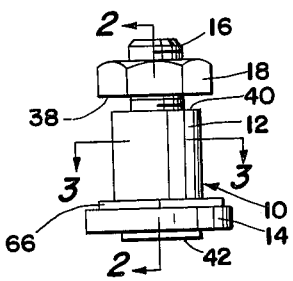
FIG. 1 is an elevational view of one form of the invention adapted particularly to secure metal parts to apertured metal panels.
Figure 2:
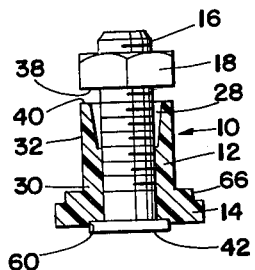
FIG. 2 is a sectional view of the fastener of FIG. 1 taken as indicated by the line 2—2 in FIG. 1.
Figure 3:
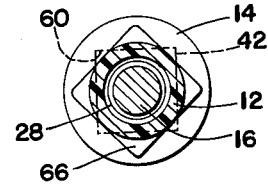
FIG. 3 is another sectional view of the fastener of FIG. 1 taken as indicated by the line 3—3 in FIG. 1.
Figure 4:
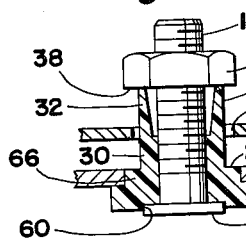
FIGS. 4, 5 and 6 are sectional views of the fastener of FIG. 1 similar to that of FIG. 2 but showing successive stages of deformation of the cylindrical body during application of the fastener to a panel.
Figure 5:
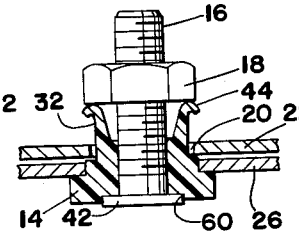
Figure 6:
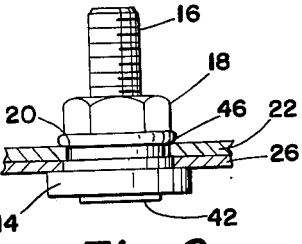

Referring now more specifically to the drawings, wherein like parts are designated by the same reference numerals throughout the various figures, a fastening device embodying the principles of the invention and adapted for general utility is shown in FIGS. 1 to 6, inclusive. This device, like the other embodiments of the invention shown and described herein, comprises a generally cylindrical body 10 formed of a suitable plastic material, such as nylon or Teflon (a polymerized tetrafluoroethylene). The body 10 comprises a tubular stud or shank portion 12 having an apertured head portion 14 integrally formed on one end thereof. This device also includes a headed bolt 16 having a threaded shank running through the head 14 and shank 12 of the body 10 for threaded engagement with a nut 18. In use, as shown in FIGS. 4–6, the body 10 and bolt 16 pass through an opening 20 in a panel 22 and through an opening 24 in an article 26 which is to be secured to the panel.

The shank 12 of the body 10 has an axial length greater than the combined thicknesses of the panel 22 and article 26 to be secured thereto. Most preferably, the shank 12 of the body has a uniform outside diameter which is somewhat less than the diameter of the opening 20 in the panel 22 so that the shank 12 may be slipped freely through the opening 20. As will be hereinafter explained, the outside diameter of the shank 12 may be considerably less than the diameter of the opening 20 and still be deformed to provide its spacing and sealing function in a satisfactory manner.

In accordance with the present invention, the shank 12 of the body 10 has an axial bore 28 extending therethrough. The portion of the bore extending through a thick wall portion 30 of the shank 12 and through the head 14 is of smaller diameter than the remainder of the bore in a thin wall portion 32 and is preferably selected to provide a friction fit on the shank of the bolt 16 to hold these parts in assembled relationship between manufacture and use thereof. The counterbore through the thin wall portion 32 is conically tapered as shown and more fully described hereinafter so as to control collapsing thereof during application of the fastener in use.

In applying the fastener to the article 26 and panel 22 as shown in FIGS. 4–6, the shank 12 of the body 10 is inserted through the article 26 and the panel 22 in a conventional manner, and the nut 18 is threaded onto the end of the bolt 16 that projects beyond the panel 22 and beyond the plastic body 10. By turning the nut 18 onto the bolt 16 with any standard tool, the lower face 38 of the nut will be caused to engage and ride on the end surface 40 of the body shank 12. Further tightening of the nut 18 draws the head 42 of the bolt 16 and the head 14 of the fastener toward the nut, thereby subjecting the thin wall portion 32 of the body shank 12 to axial pressure sufficient to cause its thin-walled free end 40 to curl outwardly as shown at 44 in FIG. 5 in the course of being collapsed and flattened to form a spacer or washer in the form of a bead or flange 46 between the nut and the panel 22 (FIG. 6). As will be observed in FIG. 5, the thin wall portion 32 of the body shank 12, being under axial compression, may tend to thicken somewhat from such compression.

Continued tightening of the nut 18 causes the outward curling of the thin wall portion 32 to continue with a rolling action until it is completely collapsed and folded downwardly against the panel 22 to form the bead or flange 46 of a thickness roughly double that of the original thin wall portion 32. At the same time, the article 26 is drawn flush against and clamped to the panel 22. This will generally occur before the bead or flange 46 is fully formed and flattened to the condition shown in FIG. 6. During this final tightening, the axial pressure on the thick wall portion 30 of the body 12 may cause it to be laterally expanded and completey fill and seal the opening 20 in the panel 22 so as, in conjunction with the flattened and folded bead or flange 46, to completely and effectively seal the aperture against the passage of dust and moisture therethrough.

Since the fastener shown in FIGS. 1 to 6, inclusive, is adapted for general purposes, the plastic body head 14 need only be sufficiently large to seat over the opening in the article 26. For larger openings, a larger head 14 may be provided and, for special adaptations, the head 14 may be differently configured so as, for example, to be received within and clampingly bear against the inturned flanges of a molding clip in accordance with the embodiment of the invention shown in FIG. 7 and described below. Further, as will be apparent, if it is desired to insulate the article 26 from the panel 22, the article 26 may be secured externally of the body head 14 between it and the bolt head 42, rather than as shown in FIGS. 4-6.

In most instances, the fastener of FIGS. 1-6 (and the other forms of the invention as well) is desirably designed to prevent the bolt 16 from rotating within the body 10 and the body 10 from rotating relative to the article 26 during tightening of the nut 18. Thus, in this embodiment of the invention, the bolt head 42 is square as indicated in FIG. 3 and is partially countersunk and retained within a similarly shaped seat 60 (FIGS. 2, 3, 4 and 5) formed in the body head 14. In addition, the body head 14 is provided with a shoulder portion 66 of square or similar cross-section and reduced lateral dimensions to be received in the article aperture 24, which may be similarly configured to restrain the body 10 against rotation relative to the article.

Figure 7:
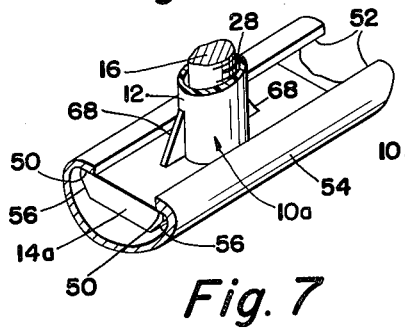
FIG. 7 is a perspective view of a modified form of the invention adapted for use in securing a metal molding strip to an apertured metal panel.

In the form of the invention shown in FIG. 7, the fastener of the invention is employed as a molding clip, the body head 14 of the embodiment of FIGS. 1-6 being substituted by the body head 14a for that purpose. As shown in FIG. 7, the body head 14a is a flat, rectangular member having opposite side edges 56 thereof that are beveled to provide side shoulders 50 adapted to engage and be clamped against inturned flanges 52 of a molding strip 54 for an automobile, refrigerator, or the like for securing it to an apertured panel. The beveling of the side edges 56 of the head 14a permits the molding strip to be snapped over the head by a cam action that springs the inturned flanges 52 of the molding strip outwardly as they are forced around the shoulders 50 and released to snap back thereunder.

The molding clip of FIG. 7 is applied to an apertured panel in the same manner as the embodiment of FIGS. 1-6, the construction and mode of operation of the shank portion 12 of the body 10 being the same in both embodiments. However, in the embodiment of FIG. 7, a pair of radially outwardly extending webs or lugs 68 are molded integrally with the body 10a adjacent the shank and head portions to engage and grip the periphery of an opening in a mounting panel for restraining the fastener against any tendency to rotate about its axis as the nut is being tightened onto the bolt. As will be appreciated by those skilled in the art, other gripping schemes may be employed in place of the lugs 68 according to the particular form of the invention and its relationship with a mounting panel and part to be mounted thereon. For example, where the body head directly engages a non-rotatable part, the engaging undersurface of the body head may be corrugated or roughened in a conventional manner to provide greater resistance to relative rotation of the fastener and the non-rotatable part engaged by that undersurface.

Figure 8:
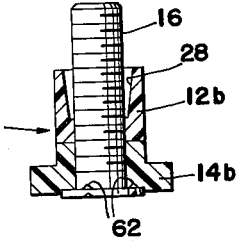
FIG. 8 is a sectional view similar to FIG. 2 and showing another modification of the invention involving a two part body.

FIG. 8 shows a fastener similar to that shown in FIGS. 1-6 and embodying all of the principles of the present invention. However, in this modification of the invention, a shank portion 12b and a head portion 14b of the fastener body are formed as separate parts and are held by friction fits on the bolt 16 in the relative positions shown. An advantage of this construction resides in the fact that the same type of shank 12b may be used with any of a number of different body head portions to suit a variety of applications requiring different body head forms.

In the embodiment of the invention shown in FIG. 8, relative rotation of the bolt 16 and the head portion 14b of the fastener is restrained by providing one or more prong-like projections 62 on the undersurface of the bolt head. These projections are adapted to bite into the body head 14b when the parts are initially assembled at the time of manufacture in the relationship shown in FIG. 8.

Figure 10:
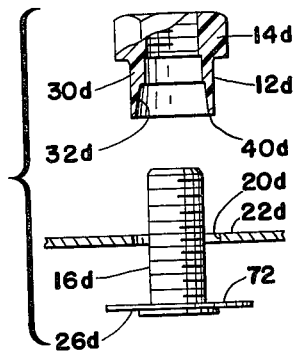
FIG. 10 is an exploded, longitudinal sectional view of still another form of the invention wherein the nut is integrally formed on the end of the thick wall portion of the cylindrical body.
Figure 11:
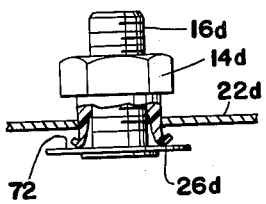
FIGS. 11 and 12 are views of the device of FIG. 10 showing successive stages of deformation of the cylindrical body during application of this form of the invention to a work structure.
Figure 12:
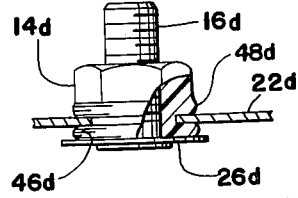

The fastener of FIGS. 10-12 is basically the same as the other fasteners heretofore shown and described except that the body head 14d is shaped and internally threaded as shown to serve both as the nut and as the body head. The shank 12d has its thicker portion 30d at the end thereof adjoining the nut head 14d and its thinner portion 32d at its free end. The advantage of this construction lies in the fact that the device may be used with an article 26d to which a bolt 16d is welded or otherwise integrally attached. As shown in FIGS. 11 and 12, when the bolt 16d is projected through an aperture 20d in a panel 22d and the fastener body is threaded onto the bolt shank, the thin wall body portion 32d of the body may be projected through the same opening 20d about the bolt shank and into engagement with the article 26d which, in this case, performs the shank deforming function of the nut 18 in the devices of FIGS. 1-8. As shown, the thin wall shank portion 32d curls and collapses under axial pressure between the nut head 14d and the article 26d and, as this force is increased by continued turning of the nut portion 14d, the thin wall shank portion is folded and flattened between the face 72 of the article 26d and the opposed surface of the plate 22d to form a bead 46d (FIG. 12). The bead 46d and the plastic nut 14d seal the aperture 20d and insulate both the article 26d and the bolt 16d from the panel 22d.

Depending upon the length of the shank 12d and how much of it is projected through the panel aperture 20d as the shank is axially compressed, the shank portion 30d immediately adjacent the nut portion 14d may also be deformed and squeezed radially outwardly to form an additional bead 48d between the panel and the nut portion as the tightening of the nut portion on the bolt continues.

In this last described embodiment of the invention, it will be observed that the nut portion 14d and shank portion 12d rotate within the panel aperture 20d during application of the fastener so that the outer end 40d of the shank portion rides on the face 72 of the article 26d. In this case, there is need to prevent rotation of the article 26d and the bolt 16d by any appropriate external means. Since the bolt 16d is welded to or otherwise integrally formed with the article 26d, only the latter need be so restrained. If this should not be the case, the bolt 16d may be provided with an appropriately shaped head for being gripped by a suitable wrench or other tool.

Figure 9:
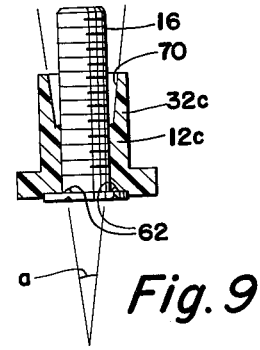
FIG. 9 is still another view similar to FIG. 2 that is presented for reference in describing details of a conically tapered counterbore defining the thin wall portion of the cylindrical body in each illustrated form of the invention.

Referring now to FIG. 9, the internal taper of the bore 70 of a thin wall portion 32c of a body shank 12c is indicated by converging imaginary lines that intersect at an angle $a$. Desirably, the angle $a$ is of the order of 10 to 20 degrees (i.e., the taper of the bore makes an angle of 5 to 10 degrees with the axis of the fastener). The function of this taper is to control the collapsing action of the thin skirt portion 32c as the nut progresses along the bolt 16 so that the skirt curls outwardly as shown rather than bulging outward midway between the inner and free outer ends of the thin wall portion of the body while the free outer end curls inwardly toward the threads of the bolt. Without the taper and its effect of controlling the formation of the annular sealing washer or bead, the free end of the skirt, as it is forced axially along and inwardly toward the bolt shank by the nut, will tend to engage and bind on the bolt threads, interfere with threading the nut onto the bolt shank, create excessive torque conditions, and end up as a mass of plastic of indeterminant shape. This may cause a wrench to slip on the nut before the nut is completely seated or cause rotation of the fastener as a whole, resulting in a failure to complete the nut seating and washer forming action and/or an incompletely sealed aperture in the mounting panel.

Although dimensional relationships of the parts of the fasteners of the invention will desirably be varied somewhat according to the particular form and use of the fastener, best results have generally been obtained when the axial length of the tapered bore portion 70 from the open or free end of the skirt is approximately 60% of the outside diameter of the skirt. This means that, on a skirt having an outside diameter of, say, 0.25 inch, the taper progresses axially for a distance of about 0.15 inch from the free end of the skirt, terminating at a portion of sufficiently reduced diameter for the bolt 16 to be received and held in the thick wall portion 12c of the fastener body with a friction fit. In a representative clip for securing a metal molding strip to a panel, a standard, 10–24 stud ⅝ inch long is employed with a plastic body having an overall shank length of 0.25 inch. The thin wall skirt portion 32c defined by the tapered internal bore 70 has a length of 0.15 inch from the open, free end of the skirt. Using a skirt taper in the aforementioned range of 5 to 10 degrees (angle $a$ of 10 to 20 degrees) the deformed skirt portion 32c produces a washer having an outside diameter of approximately 0.40 inch (depending upon the degree to which the nut is tightened onto the bolt).

From the foregoing, it will be apparent that the present invention may take numerous different forms as may be required for different fastening applications. In accordance with the invention, in all embodiments thereof, the thin wall shank or skirt portion of the cylindrical, plastic, fastener body will extend for a substantial portion of the length of the body with a generally cylindrical outer contour and a conically tapered inner bore that converges inwardly from the free end of the skirt portion to a cylindrical bore extending further through the body to the opposite end thereof. The thin wall skirt portion thus extends to the free end thereof from the thick wall portion with a gradually decreasing wall thickness and a gradually increasing clearance about the shank of the bolt inserted therethrough. As a result, when the sleeve is axially compressed between the bolt head and a nut being threaded thereon, the thin wall skirt portion will curl radially outwardly intermediate its ends with a rolling action until it is collapsed to a flatly folded form against and in sealing engagement with the apertured panel through which the fastener is inserted. By reason of the conical internal bore of the thin wall skirt portion, the collapsing thereof is controlled, and the undesired action described above is avoided.

Numerous operational advantages of the device are obtained when it is constructed in accordance with the invention. These include:

(1) The fastener collapses with a controlled action that is substantially confined to the thin wall skirt portion having the conical internal bore, causing the formation of the flattened annular washer of plastic material that insulates the nut from the mounting panel in a consistent, controlled manner.

(2) The thick wall portion of the body may be radially expanded by axial compression during the final tightening of the nut on the bolt so as to fill and seal the aperture in the mounting panel, as well as reliably insulate the shank of the bolt from the periphery of the mounting panel aperture.

(3) The combination of the controlled collapsing action of the thin wall skirt portion and radial expansion of the thick wall portion of the fastener body provides a positive seal at both sides of the mounting panel, completely closing the aperture therethrough and positively sealing the aperture against penetration of moisture and dirt.

(4) The insulating spacing of the bolt and nut from the mounting panel prevents physical contact of the panel with the bolt or nut and prevents electrolytic action therebetween, thus greatly reducing corrosion.

(5) The resilient, plastic material, such as nylon or Teflon, has a "memory factor" which tends to maintain an expanding force on the nut and bolt so as to provide the effect of a self-acting "lock washer" that prevents the nut from being loosened on the bolt by vibration. This is a particular advantage when the fasteners of the invention are employed on automotive vehicles, heavy machinery, and the like where vibration, bumping, etc. produce constant vibration.

Since other obvious modifications of the invention may be made without departing from the principles thereof as described and illustrated herein, the scope of the invention is not intended to be limited by details of the embodiments shown and described, except as required by the terms of the appended claims.

I claim:

1. A fastener for securing a part to an apertured panel through which the fastener protrudes, the fastener comprising a sleeve of relatively rigid plastic capable of severe plastic deformation without fracturing, a threaded nut at one end of said sleeve, a bolt having a threaded shank extending through and in sliding engagement with a portion of the sleeve, and means including a head on said bolt at the opposite end of said sleeve from the nut, said sleeve having—

(a) a generally cylindrical outer contour for a substantial portion of its length from one end thereof which is to be inserted through a panel aperture, (b) an enlarged boss portion at its opposite end, and (c) a conical internal bore converging inwardly from said one end for a substantial distance to a cylindrical bore extending toward said opposite end, said conical bore being coaxial with said cylindrical bore and having a side wall that forms an angle of from 5 to 10 degrees with the axis of said cylindrical bore, the conical bore defining an annular skirt extending from said cylindrical bore to said one end of the sleeve with a gradually decreasing wall thickness and a gradually increasing clearance about the bolt shank;

said means on said bolt and said nut constituting force applying members disposed to exert axial pressure on opposite ends of said sleeve as the nut is threaded along the bolt shank, one of said force applying members having an essentially planar surface perpendicular to the axis of the bolt shank and disposed initially to engage said one end of said sleeve with an essentially axially directed force when the sleeve is axially compressed between said force applying members, said planar surface extending from a location that is spaced radially outwardly beyond said annular skirt to said bolt shank, whereby by virtue of the conical bore of said sleeve, said one end of said annular skirt will curl radially outwardly and axially toward said opposite end with substantially a rolling action to form a flange compressed into sealing engagement with a panel or part through which the sleeve protrudes.

2. A fastener according to claim 1 in which said sleeve includes a radially outwardly extending retaining flange engaged by said bolt head and integrally formed on the end of the sleeve opposite the skirt end thereof for engaging structure through which the sleeve and bolt are inserted and spacing the bolt head therefrom.

3. A fastener according to claim 1 in which said sleeve includes a radially outwardly extending retaining flange engaged by said bolt head and integrally formed on the end of the sleeve opposite the skirt end thereof for engaging structure through which the sleeve and bolt are inserted and spacing the bolt head therefrom, and plastically deformable lugs integrally formed externally on the sleeve adjacent said flange for engaging a surrounding structure and restraining rotation of the sleeve relative thereto while a nut is being threaded onto and along said bolt.

4. A fastener according to claim 1 including said nut integrally formed on said sleeve as a part thereof at the end thereof opposite said skirt.

5. A fastener according to claim 1 in which the sleeve portion of cylindrical outer contour at one end of the fastener and the enlarged boss portion at the opposite end thereof are separate parts having coaxial bore portions of a common diameter for receiving the shank of said bolt with a tight fit for retaining said separate parts assembled on the bolt.

References Cited by the Examiner

UNITED STATES PATENTS

| | | | |
|---|---|---|---|
| 2,021,176 | 11/1935 | Curtis | 85—70 |
| 2,435,876 | 2/1948 | DeSwart | 85—74 |
| 2,525,117 | 10/1950 | Campbell | 85—77 |
| 2,788,047 | 4/1957 | Rapata | 85—80 |
| 2,828,095 | 3/1958 | Beck et al. | 85—70 |
| 3,021,927 | 2/1962 | McKee | 85—70 |
| 3,137,048 | 6/1964 | Bedford. | |

FOREIGN PATENTS 648,772   8/1937   Germany.

CARL W. TOMLIN, *Primary Examiner.*

EDWARD C. ALLEN, *Examiner.*

M. PARSONS, JR., *Assistant Examiner.*